United States Patent
Lamberg (10) Patent No.: US 7,765,404 B2
(45) Date of Patent: Jul. 27, 2010

(54) PROVIDING CONTENT IN A COMMUNICATION SYSTEM

(75) Inventor: Samu Lamberg, Vähikkälä (FI)

(73) Assignee: Nokia Corporation, Espoo (FI)

( * ) Notice: Subject to any disclaimer, the term of this patent is extended or adjusted under 35 U.S.C. 154(b) by 1167 days.

(21) Appl. No.: 10/880,217

(22) Filed: Jun. 29, 2004

(65) Prior Publication Data

US 2005/0286721 A1      Dec. 29, 2005

(51) Int. Cl.
*H04L 9/32* (2006.01)

(52) U.S. Cl. ............... 713/181; 726/29; 726/30; 726/31; 380/270; 380/247; 380/277

(58) Field of Classification Search .......... 380/270, 380/247, 277, 285; 726/29, 30, 31; 713/181
See application file for complete search history.

(56) References Cited

U.S. PATENT DOCUMENTS

| | | | | |
|---|---|---|---|---|
| 5,509,070 | A |   | 4/1996 | Schull ............... 380/4 |
| 5,661,806 | A | * | 8/1997 | Nevoux et al. ......... 380/247 |
| 5,809,144 | A | * | 9/1998 | Sirbu et al. ............ 705/53 |
| 5,883,954 | A |   | 3/1999 | Ronning ............... 500/4 |
| 5,933,498 | A | * | 8/1999 | Schneck et al. ........ 705/54 |
| 5,991,407 | A | * | 11/1999 | Murto ................. 380/248 |
| 6,029,151 | A | * | 2/2000 | Nikander ............. 705/39 |
| 6,134,548 | A | * | 10/2000 | Gottsman et al. ....... 1/1 |
| 6,226,618 | B1 | * | 5/2001 | Downs et al. .......... 705/1 |
| 6,286,103 | B1 | * | 9/2001 | Maillard et al. ....... 726/26 |
| 6,301,660 | B1 | * | 10/2001 | Benson ............... 713/165 |
| 6,401,085 | B1 | * | 6/2002 | Gershman et al. ...... 1/1 |
| 6,690,930 | B1 | * | 2/2004 | Dupre ................ 455/411 |
| 6,745,326 | B1 | * | 6/2004 | Wary ................. 713/168 |
| 6,754,642 | B2 | * | 6/2004 | Tadayon et al. ........ 705/51 |
| 6,792,113 | B1 | * | 9/2004 | Ansell et al. .......... 380/284 |
| 6,915,272 | B1 | * | 7/2005 | Zilliacus et al. ....... 705/26 |
| 6,918,039 | B1 | * | 7/2005 | Hind et al. ........... 726/3 |
| 7,028,009 | B2 | * | 4/2006 | Wang et al. ........... 705/51 |

(Continued)

FOREIGN PATENT DOCUMENTS

DE        199 06 449 C1      8/2000

(Continued)

OTHER PUBLICATIONS

"Wireless Application Group User Agent Profile Specification", WAG UAPROF, Version 10 Nov. 1999.

*Primary Examiner*—David Garcia Cervetti
(74) *Attorney, Agent, or Firm*—Harrington & Smith (57) ABSTRACT

The present invention relates to a method for providing content in a communication system. The method comprises encoding content to a first part and a second part. Furthermore, the method comprises protecting the second part of the content against unauthorised use. Furthermore, the method comprises transmitting the content to user equipment associated with an identity module. The present invention relates also to a method for obtaining content in user equipment in a communication system. The method comprises receiving content encoded to a first layer and a protected second layer. Furthermore, the method comprises requesting for opening the protection of the second layer, receiving opening means and opening the protection of the second layer using the opening means interacting with an identity module associated with the user equipment. Furthermore, a network element and user equipment are configured to execute the method.

44 Claims, 4 Drawing Sheets

U.S. PATENT DOCUMENTS

| | | | |
|---|---|---|---|
| 7,069,001 B2* | 6/2006 | Rupp et al. | 455/411 |
| 7,072,646 B1* | 7/2006 | Brune et al. | 455/417 |
| 7,139,372 B2* | 11/2006 | Chakravorty et al. | 379/114.01 |
| 7,187,947 B1* | 3/2007 | White et al. | 455/556.1 |
| 7,233,671 B2* | 6/2007 | Wu | 380/270 |
| 7,240,033 B2* | 7/2007 | Kuriya et al. | 705/51 |
| 7,280,983 B2* | 10/2007 | Kuroda et al. | 705/57 |
| 7,324,833 B2* | 1/2008 | White et al. | 455/556.1 |
| RE40,334 E * | 5/2008 | Millard et al. | 726/26 |
| 7,568,234 B2* | 7/2009 | Naslund et al. | 726/26 |
| 7,626,963 B2* | 12/2009 | Patel et al. | 370/331 |
| 2003/0066881 A1* | 4/2003 | Maenpaa et al. | 235/380 |
| 2003/0101345 A1* | 5/2003 | Nyberg | 713/170 |
| 2004/0013269 A1* | 1/2004 | Du et al. | 380/284 |
| 2005/0108171 A1* | 5/2005 | Bajikar et al. | 705/51 |
| 2005/0124288 A1* | 6/2005 | Karmi et al. | 455/3.01 |
| 2005/0135622 A1* | 6/2005 | Fors et al. | 380/268 |
| 2005/0235143 A1* | 10/2005 | Kelly | 713/165 |
| 2005/0246282 A1* | 11/2005 | Naslund et al. | 705/52 |
| 2005/0278787 A1* | 12/2005 | Naslund et al. | 726/26 |
| 2006/0265436 A1* | 11/2006 | Edmond et al. | 707/204 |
| 2006/0288407 A1* | 12/2006 | Naslund et al. | 726/9 |
| 2007/0005503 A1* | 1/2007 | Engstrom et al. | 705/59 |
| 2007/0226805 A1* | 9/2007 | Jeal et al. | 726/27 |

FOREIGN PATENT DOCUMENTS

| | | |
|---|---|---|
| EP | 0 994 404 A1 | 4/2000 |
| EP | 1 113 359 A3 | 7/2001 |
| GB | 2 366 969 | 3/2002 |
| WO | WO 2004/017664 A1 | 2/2004 |

* cited by examiner

PROVIDING CONTENT IN A COMMUNICATION SYSTEM

FIELD OF THE INVENTION

The invention relates to communication systems, and more particularly, but not exclusively, to providing content in a communication system.

BACKGROUND OF THE INVENTION

A communication system can be seen as a facility that enables communication sessions between two or more entities such as user terminal and/or other nodes associated with the communication system. Users of a communication system may be offered and provided numerous services, such as two-way or multi-way calls, data communication or multimedia services or simply an access to a network, such as the Internet. The services may be offered by an operator of the communication system or by an external service provider.

Examples of communication systems may include fixed line communication systems, such as a public switched telephone network (PSTN), wireless communication systems, e.g. global system for mobile communications (GSM), general packet radio service (GPRS), universal mobile telecommunications system (UMTS), wireless local area network (WLAN) and so on, and/or other communication networks, such as an Internet Protocol (IP) network and/or other packet switched data networks. The IP Multimedia Subsystem (IMS) is an example of a system providing multimedia services. Various communication systems may simultaneously be concerned in a connection.

An end-user may access a communication network by means of any appropriate user equipment (UE), for example a mobile terminal, such as a mobile station (MS), a cellular phone, a personal digital assistant (PDA) or the like, or other terminals, such as a personal computer (PC), or any other equipment operable according to a suitable network protocol, such as a wireless applications protocol (WAP) or a hypertext transfer protocol (HTTP). The user equipment may support, in addition to call and network access functions, other services, such as short message service (SMS), multimedia messaging service (MMS), electronic mail (email), Web service interface (WSI) messaging and voice mail. A mobile terminal may comprise an identity module, for example a subscriber identity module (SIM), a UMTS subscriber identity module (USIM) or a wireless identity module (WIM). The identity module is suitably a device allowing transfer of subscription data from one UE to another and may be shortly referred to as a subscriber. Respectively, a mobile station without the identity module may be referred to as a Mobile Equipment (ME).

Using the MMS, or multimedia messaging, it is possible to provide various content services, such as news services, sound clips, video clips, and so on, from a server to UE. MMS typically employs Wireless Application Protocol (WAP) on a circuit switched or packet switched bearer. However, there may be numerous difficulties or drawbacks in providing content using the MMS. For example, the users may perceive as relatively high the charging of content services over wireless connections with relatively slow speeds. Small displays of some types of mobile stations may increase a threshold in ordering content provided using the MMS and render these services unattractive.

A content provider may, for instance, attempt to attract users or customers by providing free samples or "teasers". The free samples or teasers may provide only a part of the content or the entire content with a reduced quality. This should attract users to order a sample and to become keen on ordering the whole content or a better quality version, which are chargeable.

To charge for content, a content provider may run a private charging procedure or may rely on a cellular network operator. Charging via a telephone bill with the aid of the network operator may be a preferred solution due to its ease and low running costs. The content provider may itself run a cellular network or the content provider may make a charging agreement with the network operator. Running a cellular network may not be feasible for many content providers. Having a charging agreement with the network operator competes with the interest of the network operator to provide the content services itself.

If only a part of content is provided as a sample, the user may not be easily attracted to test the service at all, at least not more than once. Even if the full content with lower quality was first provided as a sample, the user may consider the gain from getting the content in better quality not worth the trouble of ordering and waiting for the full content to download.

Patent Publication U.S. Pat. No. 5,933,498 presents an arrangement for controlling access and distribution of digital property, wherein protected rules are distributed with data and the access to the data is controlled by the protected rules. Patent publication U.S. Pat. No. 5,509,070 presents an arrangement where a computer program is delivered with a software tool, which provides password functionality bundled in the computer program. The arrangement of U.S. Pat. No. 5,509,070 works only with executable content since the digital rights management functionality is provided by the content itself. U.S. Pat. No. 5,509,070 separates content delivery from charging, which may suffice for charging computer programs that a user buys rarely, perhaps few times a year. However, separating the content delivery from the charging may not suit well for news clips or pieces of music or similar content services that a user is hoped to buy often, for example on a daily basis.

SUMMARY OF THE INVENTION

In accordance with an aspect of the invention, there is provided a method for providing content in a communication system. The method comprises encoding content to a first part and a second part. Furthermore, the method comprises protecting the second part of the content against unauthorised use. Furthermore, the method comprises transmitting the content to user equipment associated with an identity module.

In accordance with a further aspect of the invention, there is provided a method for obtaining content in user equipment in a communication system. The method comprises receiving content encoded to a first layer and a protected second layer. Furthermore, the method comprises requesting for opening the protection of the second layer, receiving opening means and opening the protection of the second layer using the opening means interacting with an identity module associated with the user equipment.

In accordance with a further aspect of the invention, there is provided a network element in a communication system configured to encode content to a first part and a second part, to protect the second part of the content against unauthorised use and to transmit the content to user equipment associated with an identity module.

In accordance with a further aspect of the invention, there is provided user equipment configured to receive content encoded to a first part and a second complementary part, to request for opening the second part, to receive opening means and to open the protection of the second part using the opening means interacting with an identity module associated with the user equipment.

Embodiments of the invention allow delivering content in two parts, namely a first part, also called a basic part, and a second part, also called a complementary part, the second part being protected against unauthorised use. Both parts are delivered together so that only the first part may be used without specific restrictions and the rights for the second, protected part can be obtained, such as bought, separately. The user need not suffer any further download time on deciding to purchase the protected or locked portion. After the decision to purchase the locked portion is made, the locked portion may already be received or is being received so that only signalling for obtaining a key to use the locked portion may be needed. On slow communications links, this may provide significant advantages. Particularly, in case the content is delivered as a part of a subscribed service that sends regular updates this may be advantageous, as the initial longer content provision may go completely unnoticed to the user.

The embodiments of any one aspect also apply to various other aspects of the invention as appropriate. In sake of briefness, the embodiments have not been repeated in connection with every aspect of the invention. A skilled reader will appreciate the advantages of the various aspects based on the advantages of an aspect of the invention.

BRIEF DESCRIPTION OF THE DRAWINGS

The invention will now be described in further detail, by way of example only, with reference to the following examples and accompanying drawings, in which.

DETAILED DESCRIPTION OF PREFERRED EMBODIMENTS

Figure 1:
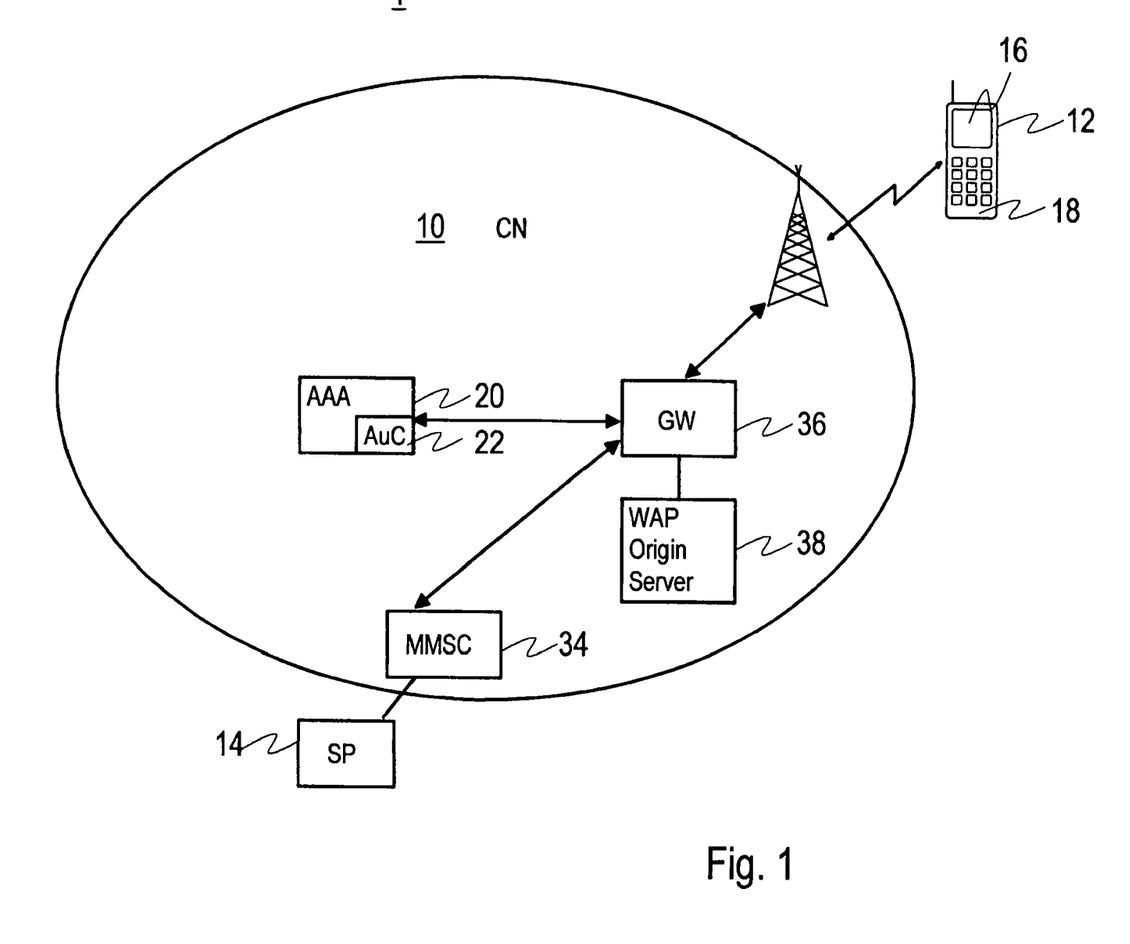
FIG. 1 shows an example of a system in which the embodiments of the invention may be implemented.
Figure 2:
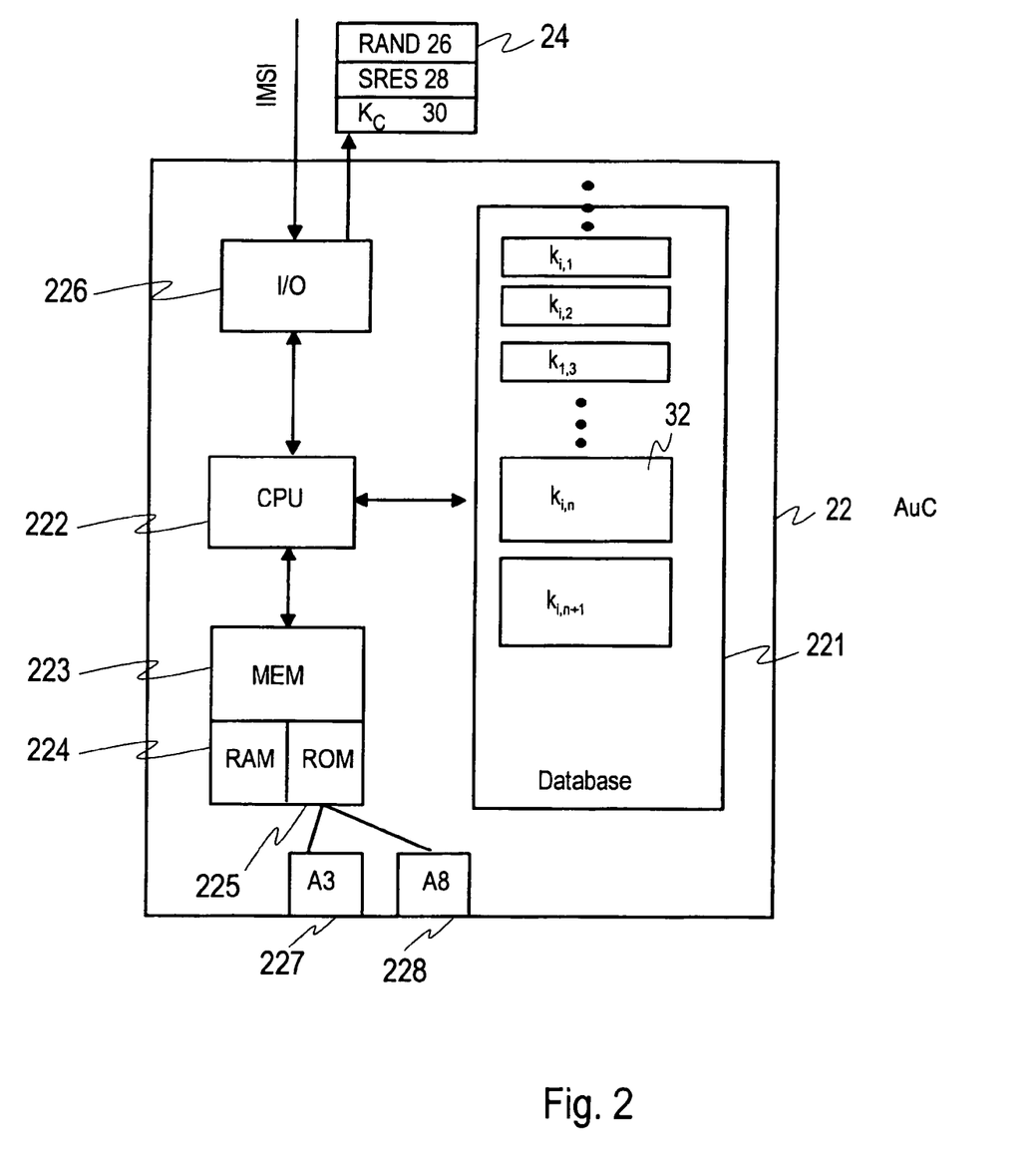
FIG. 2 shows an exemplary authentication centre.
Figure 3:
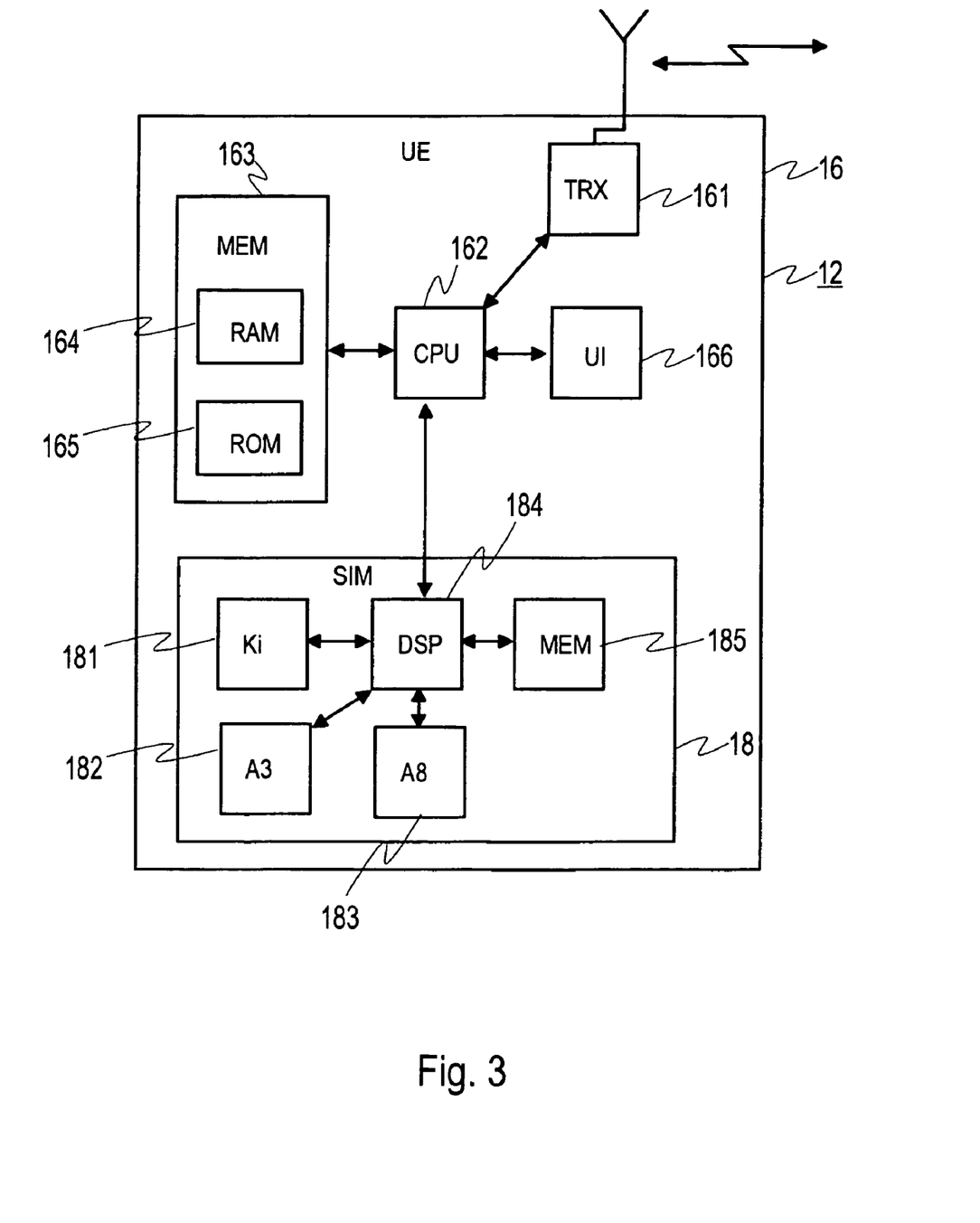
FIG. 3 shows exemplary user equipment.

FIGS. 1 to 3 show an exemplary system 1, wherein FIG. 1 shows a block diagram of the system 1 as a whole and FIGS. 2 and 3 show block diagrams of exemplary authentication centre (AuC) 22 and user equipment (UE) 12, respectively.

System 1 includes a communication network (CN) 10, User Equipment (UE) 12 and a Service Provider (SP) 14. The UE 12 comprises a Mobile Equipment (ME) 16 and a Subscriber Identity Module (SIM) 18. The CN 10 comprises an Authentication, Authorisation and Accounting server (AAA) 20, an MMS Service Centre (MMSC) 34, a WAP Gateway (GW) 36 and a WAP origin server 38.

The AAA server 20 comprises an Authentication Centre (AuC) 22, an embodiment of which is shown more in detail in FIG. 2. The AuC 22 is capable of issuing authentication codes, such as GSM triplets 24 each consisting of a challenge (RAND) 26 and two data items derivable from the RAND 26, namely Signed RESponse (SRES) 28 and a session key ($K_c$) 30. These two items, SRES and $K_c$, are derivable by particular encryption algorithms (A3 227 and A8 228) from a shared secret $K_i$ 32 specific to the particular subscriber represented by the SIM 18 of the UE 12. Only the SIM 18 and the AuC 22 should know the shared secret $K_i$ 32, as the operation of the AAA 20 depends upon $K_i$ and the algorithms A3 and A8 not leaking to other parties.

The AuC comprises a database 221 comprising the shared secrets $K_i$ 32 of n+1 subscribers presented as fields $k_{i,1}$, $k_{i,2}$, $k_{i,3}$, ... $k_{i,n}$, $k_{i,n+1}$. The AuC 22 also comprises a Central Processing Unit (CPU) 222, a memory (MEM) 223 containing a Random Access Memory (RAM) 224 as a work memory and a Read Only Memory (ROM) or non-volatile i.e. persistent memory 225. The AuC 22 also comprises an Input/Output (I/O) block 226 and authentication algorithms A3 227 and A8 228 either common for the n+1 subscribers as depicted in FIG. 2 or, alternatively, separately for each subscriber in respective fields of the database (not shown). The ROM 225 comprises computer code or software for controlling the CPU 222. The CPU is connected to the memory 223, the I/O 226 and the database 221. Under operation, the AuC 22 is capable of obtaining GSM triplets or other authentication code for a given subscriber as identified by a subscriber specific identifier, such as an International Mobile Subscriber Identification (IMSI), and of yielding, responsively, GSM triplets 24.

The GW 36 may be a packet and/or circuit switched data enabled gateway such as a GPRS Support Node that supports WAP 1.1 User Agent Profile (UAProf) and hence can store a UAProf. The UAProf provides an advantageous capability for the UE 12 to inform the CN 10 of capabilities of the UE and/or user preferences including a new attribute referred hereinafter as refinement DRM attribute. The refinement DRM attribute is suited to advice the CN 10 of the UE 12 supporting particular digital rights management procedure illustrated with further detail in this exemplary description.

User equipment according to an embodiment of the invention is shown in FIG. 3. The UE 12 may contain a Mobile Equipment (ME) part 16 and a SIM 18 in a manner known, for instance, from GSM telephones or mobile stations. The ME 16 comprises a radio transceiver 161 coupled with a Central Processing Unit (CPU) 162. The CPU 162 is further connected with a User Interface (UI) 166 and a memory (MEM) 163. The memory 163 contains a Random Access Memory (RAM) or work memory 164 and a Read Only Memory (ROM) 165. The ROM is typically a non-volatile or persistent memory suitable for long-term storing of data, such as operating system and computer program code (software) for controlling the operation of the CPU 162. The CPU has further an access to the SIM 18 as illustrated by a direct connection. It should be understood that the normal Application Specific Integrated Circuits (ASIC) and other normal hardware implementation not necessary to understand the present invention have been omitted. For example, normally there would be an ASIC next to each processor. It should also be understood that any of the blocks presented might be provided within a common chip.

The SIM 18 comprises the authentication functions used in the mobile communication systems, such as the GSM, UMTS or CDMA 2000. Particularly, the SIM 18 may comprise a shared secret $K_i$ 181, any algorithms necessary to authenticate the SIM with a GSM operator, such as A3 182 or A8 183, and a processor 184, such as a Digital Signal Processor DSP, that suitably controls the operation of the SIM 18. The processor 184 is connected to the shared secret $K_i$ 181, algorithms 182 and 183 (either hardwired or software code representing the shared secret and/or algorithms) and memory 185.

In a normal operation, the CPU 162 controls the operation of the ME 16 so that it communicates as specified in the respective telecommunications standards such as GSM, UMTS or CDMA 2000. When implementing the present invention, the CPU 162 may receive signals requiring co-operation with the SIM 18. In such a case, the CPU 162 will signal with the SIM 18 that will use its own processor and secret data in order to respond to the CPU 162 with an authentication code, such as a GSM triplet comprising a challenge RAND 26 with respective SRES 28 and session key $K_c$ 30, as described in connection with FIG. 2.

It should be appreciated that FIGS. 1-3 only present exemplifying embodiments whereas numerous variations are available in the technical implementation of the invention only limited by the appended claims. For instance, the communication network 10 in FIG. 1 may be a GSM network. Alternatively, the network may be another Time Division Multiple Access (TDMA) based network such as a Personal Digital Communication (PDC) network, a Code division Multiple Access (CDMA) based network, such as an IS-95 or a Wideband CDMA (W-CDMA) network, or any other appropriate communication network. In an embodiment, the communication network 10 is provided at least in part by an Internet Protocol (IP), network. The SIM may be, but need not be, a detachable module. In an alternative, similar challenge-response capability may be built into the UE 12. The WAP Origin server 38 may be contained in the CN 10 as shown in FIG. 1. In an alternative, the WAP Origin server 38 may be distributed and accessible to the WAP Gateway, for instance, via the service provider 14.

Figure 4:
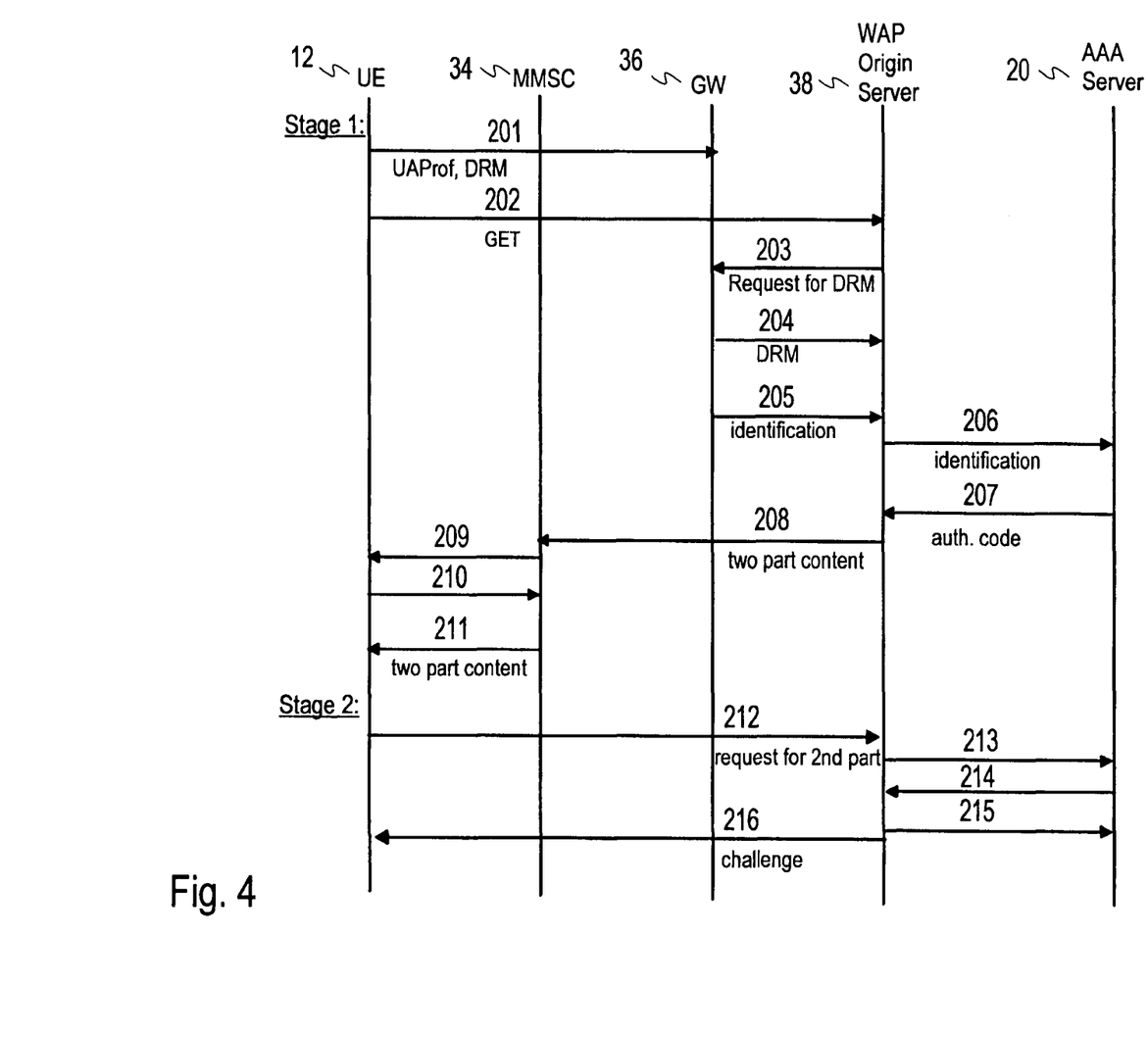
FIG. 4 shows a signalling chart illustrating an embodiment of the invention.

FIG. 4 shows a signalling chart illustrating an embodiment of the invention performed using Multimedia Messaging Service (MMS) presently supported by various mobile telecommunication networks, such as various GSM, GPRS and UMTS networks. FIG. 4 illustrates some major signals exchanged in the system 1 of FIG. 1. The process exemplified by FIG. 4 may split in two stages: delivery of the content with partial protection in stage 1 and obtaining the rights to use the whole content including the protected part in stage 2.

Stage 1 may begin either on user instruction or it may be based on a preordered service that may invoke new content delivery on predetermined intervals or on meeting certain criteria (such as a goal being made in a soccer match). A user invoked case is described in the following. On instruction of a user, the UE 12 initiates a process for obtaining desired content. The UE 12 will attach to a communication network service, such as a GPRS service, and provides a UAProf or Capability and Preference Information (CPI) data to the gateway 36 in signal 201. This signal contains an attribute refinement DRM in addition to the normal UAProf contents. The UAProf is based on Wireless Application Protocol (WAP) discussed in the Wireless Application Group User Agent Profile Specification WAG UAPROF version 10 Nov. 1999. The User Agent Profile (UAProf) specification extends WAP 1.1 to enable the end-to-end flow of a User Agent Profile (UAProf), also referred to as Capability and Preference Information (CPI), between the WAP client (i.e. User Agent in the MMS terms or User Equipment), the intermediate network points, and an origin server 38 (such as content provider's server). This UAProf or CPI may include, but is not limited to, hardware characteristics (screen size, colour capabilities, image capabilities, manufacturer, and so on), software characteristics (operating system vendor and version, support for Mobile station application Execution Environment (MExE), list of audio and video encoders, and so on), application and/or user preferences (browser manufacturer and version, markup languages and versions supported, scripting languages supported, and so on), WAP characteristics (Wireless Markup Language (WML) script libraries, WAP version, WML deck size, and so on), and network characteristics (bearer characteristics such as latency and reliability, and so on).

The same WAG UAPROF specification further discloses in paragraph 5.1 "Client Device" that the CPI consists of information gathered from the device hardware, active user agent software, and user preferences. In many cases, much of this information must be pre-installed directly on the device, possibly in the firmware. For instance, the device may publish a single Uniform Resource Identifier (URI) that points to default device capability information made available by the device manufacturer. Similarly, the user agent may publish a single URI that points to default software information made available by the software developer. Hence, existing MMS environment may support conveying various data to the MMS network.

Armed with the UAProf, the GW 36 is ready to serve the refinement DRM attribute to any WAP content server, such as the WAP origin server 38 providing news, ring-tone, gaming or other service related content. Signal 202 may represent a request for content, such as a so-called GET method using, for example, the HTTP. The UE 12 may request for content from the origin server 38 by means of the GET method. Responsive to signal 202, the origin server 38 may request and obtain the refinement DRM attribute from the WAP gateway, signals 203 and 204 respectively. The DRM attribute (and other UAProf data) may also be provided before the signal 202, for instance, as part of opening a Wireless Session Protocol (WSP) session with the origin server.

Once the origin server 38 has received a request to the content and the refinement DRM attribute, the origin server 38 may be prepared to provide the content in a form wherein a first part is ready for use and a second part is protected by a cryptographic measure such as encryption with a code that will be provided only against a predetermined condition, such as a payment. Signal 205 may provide the origin server 38 with the identification of the UE 12, such as IMSI, from the GW 36 in case the identification of the UE 12 is not yet known by the origin server 38. Signal 206 may then provide the identification to the AAA server 20. The AAA server verifies that the origin server 38 is approved or trusted by the operator and responds to the origin server 38 with signal 207 containing an authentication code, such as one or more GSM triplets 24.

The origin server 38 then organises, either internally or using an external sub-service provider, the content being provided in a two-part format supported by the UE 12 as indicated by the UAProf. The Origin server 38 also organises the protection of the second part by the authentication code, for example at least with one or more item of the triplet other than the challenge RAND, either internally or using an external protection sub-service provider. In an alternative, the origin server 38 can invoke organising the data in two parts already before the signal 207. In an embodiment, the origin server 38 may store the data in a two-part form in order to accelerate its operation and reduce processing load.

In a preferred embodiment of the invention, the delivery of the content is arranged using the WAP browser. However, it may equally be preferred to subscribe to a service that provides regularly new content, e.g. a news service or a music club, wherein the user need not actively retrieve data but is, instead, provided with a push-type delivery mechanism or the like. The MMS is particularly suitable for this, as an efficient and versatile standard with a substantial user base.

In signal 208, the origin server 38 may despatch to the MMSC 34 by means of the MMS the two-part content addressed to the subscriber identified by the SIM 18.

The MMSC 34 may next exchange typical MMS signalling 209, 210 including MMS notification (signal 209), MMS notification acknowledgment and MMS retrieve request (signal 210) before the MMSC 34 actually delivers the two-part content to the UE 12 in a MMS retrieve response in signal 211. The two-part content is now only partly usable by the UE

12. The first, i.e. the basic, part may be used without restrictions and the second, i.e. the complementary, part only by opening the protection. In order to facilitate the purchase of the protected second part, the MMS retrieve response carrying the two part content in signal 211 may contain a new media component comprising purchase data sufficient for the UE 12 to obtain the challenge that enables the SIM 18 of the UE 12 to obtain the necessary credentials to decode the second part for the own use of the UE 12. The purchase data preferably contain use limitations such as the number of allowed use, whether further delivery is allowed and to which group or how many times delivery is allowed or the period of such allowance and also suitably the price of the purchase. Once the user of the UE 12 desires to use the second, protected part, for instance, to get a ring-tone entirely or to enable taking into use a ring-tone in the UE 12, the user may invoke the stage 2 of the content provision process as shown in the FIG. 4.

The UE 12 may send a signal 212 to the content provider, such as the origin server 38, requesting opening the second part. The content provider responsively invokes a charging process with the AAA 20 represented by signals 213 to 215 wherein the content provider signals a UE 12 specific security item (signal 213) verifying that the subscriber or SIM 18 has approved the transaction together with the price being charged, the AAA 20 sends an OK signal 214, or a not OK signal, and the origin server 38 acknowledges with signal 215.

After a successful charging process, i.e. when signal 214 was OK, the origin server 38 sends a signal 216 carrying the challenge 26 to the UE 12. In the UE 12, the ME 16 receives the challenge 26 and passes the challenge to the SIM 18. The SIM 18 derives the response and the session key (SRES, $K_c$) of the GSM triplet 24 and uses one or both of them to decode the second part of the content. The decoding may contain decryption. In that case, only a UE comprising the particular SIM 18 can decode the second part with the data provided by the origin server 38. Even if another UE were able to capture the data exchange between the origin server 38 and the UE 12, only the first part would be usable.

The description above is only a streamlined example and various other signals may be provided or some of the signals above can be omitted. For instance, if so desired, the UE 12 may be requested to prove the desire to purchase the content using its SIM cryptography before the AAA server 20 can proceed with signals 213 to 215. This may be performed by the ME 16 computing a RAND equivalent hash code out of the purchase data, feeding the RAND equivalent hash code to the SIM 18, receiving a corresponding SRES and $K_c$, sending the SRES to the origin server 38, the content server 38 passing the SRES and the purchase data to the AAA 20, the AAA computing the RAND equivalent code and comparing respective SRES with the received SRES and if matching, accepting the transaction and charging the subscriber's normal telecommunications account. As a further security measure, the AAA 20 may subsequently return a hash code of the $K_c$ for the equivalent RAND to the UE 12 via the origin server 38 thus ensuring to the UE 12 that the origin server 38 indeed has access to its own AAA server 20 and not just fabricating data to conclude the shared secret of the SIM 18. This aforementioned further verification process also allows the normal telecommunications operator to store the transaction details for subsequent use in case the service provider would fail to provide the content as promised by advertising, for instance.

The user equipment is preferably configured such that it allows forwarding the content over a cellular network in a protected state, namely with the unprotected first layer and the protected second layer. If the content proves to be interesting, the content may be transmitted to further user equipment. In the further user equipment, the protected second layer may be decrypted as explained above.

Preferably, the user equipment should not be able to store the unprotected, such as decrypted, content, but only to open the second layer to a volatile memory. Preferably, any transmission, such as infrared (IR) or Bluetooth (BT) transmission, is prevented while the second layer is presented in an unprotected state. If the user equipment was allowed to store the unprotected content, the content could be copied to a PC or transmitted over a local link.

In an embodiment, the UE 12 may be trusted to obey any use restrictions imposed by the purchase data such as only present the content for a predetermined number of times, period of time or to only pass it to a set number of other users (zero to any integer) and after that preferably delete any data allowing the unprotection of the second part. This may be advantageous for both the telecommunications operator and the content provider, even if the purchase would not follow. The telecommunications operator may get data transfer revenues and a chance to receive an offer. Each time content is delivered a user may choose to pay. The higher the frequency of content delivery, the higher the number of paid deliveries may be even when assuming that only a small portion of all deliveries results in a purchase. It may also be in the interests of both the telecommunications operator and the content provider to encourage or at least allow local copying of the content with the second part being protected. First, the ability to further share the content may encourage to obtain the content in the first place, particularly when the users are getting accustomed to the new data services. Second, the sharing the content may provide the best possible promotion to the service, free recommendation from a happy user.

Whilst the UE 12 may be trusted not to share the content as unprotected, a small portion of fraudulently redistributed content may have little effect in business where the content expires shortly, such as news and sports commentary. In an embodiment, the service provider's copyright notice may provide an efficient tool to enforce any illegal content redistributors to stop infringing acts.

The configuration of the user equipment may be based on an add-on software or middleware, such as a Java program, or by ROM-based integrated software. In configuration of accessing the identity module, it should be ensured that other applications are not allowed to access an encryption engine of the identity module, for example to prevent various brute-force attacks by the other applications.

The use of the identity module in locking and unlocking the protected second layer of the content that is originally delivered entirely with only a small transmission fee may make the provision of cheap content very appealing. It may reduce the psychological threshold to order such content, since the charging may be performed via a telephone bill. The charge for the content is separated from the charge for the transmission so that the user may have absolute transparency to the costs and see two small fees rather than one larger.

Embodiments of the invention may provide new means of delivering content services to user equipment. A unique auto-symbiotic business relationship between the content provider, operator and user may be created in which a true win-win-win can be met. The user only may have to pay in form of slightly longer downloading times and associated costs as the entire content is always downloaded. However, the same extra downloading may benefit simultaneously the operator of the network. The downloading of the entire content may make it very attractive to actually unlock the full content or enhancement layer since the provision of high quality content can then take place in a matter of seconds rather than minutes. The use of the identity module and capability negotiation may provide an optimised experience with individual encryption such that other legitimate terminals are unable to use the content.

Although the invention has been described in the context of particular embodiments, various modifications are possible without departing from the scope and spirit of the invention as defined by the appended claims. It should be appreciated that whilst embodiments of the present invention have mainly been described in relation to mobile user equipment such as mobile terminals, embodiments of the present invention may be applicable to other types of user equipment that may access communication networks. Furthermore, the communication system may be any appropriate communication system, even if reference has mainly been made to mobile communication systems.

The invention claimed is:

1. A method comprising:
   encoding media content to a first part and a second part;
   protecting the second part of the encoded media content against unauthorized use using data derived from a secret specific to an identity module, wherein the first part of the encoded media content has not been protected against unauthorized use using data derived from the secret specific to the identity module; and
   transmitting, using a network apparatus, the first part and the protected second part of the encoded media content to user equipment associated with the identity module.

2. A method according to claim 1, wherein encoding the media content comprises encoding the media content according to user equipment capabilities based on capabilities of the user equipment and/or user preferences of the user equipment.

3. A method according to claim 1, wherein the protecting comprises encrypting the second part.

4. A method according to claim 3, further comprising requesting an authentication code comprising a challenge and a response.

5. A method according to claim 4, wherein the encrypting comprises encrypting the second part using the response as an encryption key.

6. A method according to claim 1, wherein the network apparatus is configured to transmit the first part and the second part of the encoded media content by a multimedia messaging service.

7. A method according to claim 1, wherein the data used for protecting the second part is an output of an encryption algorithm that takes the secret as an input.

8. A method as claimed in claim 7, wherein the algorithm is shared with the identity module.

9. A method as claimed in claim 8, wherein the algorithm is an authentication algorithm.

10. A method as claimed in claim 9, wherein the algorithm is algorithm A3 or algorithm A8.

11. A method as claimed in claim 10, wherein the secret is Ki.

12. A method according to claim 1, wherein the secret specific to an identity module is additionally used for authenticating and encrypting communications between the user equipment and a communications network.

13. A method comprising:
   using a transceiver configured to receive media content encoded to a first part and a second part, wherein the second part of the encoded media content is protected against unauthorized use using data derived from a secret specific to an identity module and wherein the first part of the encoded media content has not been protected against unauthorized use using data derived from a secret specific to an identity module;
   requesting opening of the protection of the second part;
   receiving enabling data; and
   opening the protection of the second part using the enabling data and the secret that is specific to and comprised in the identity module associated with a user equipment.

14. A method according to claim 13, wherein the second part is protected by encryption.

15. A method according to claim 13, wherein receiving enabling data comprises receiving a challenge corresponding to a response used as an encryption key for encrypting the second part.

16. A method according to claim 13, wherein opening the protection comprises submitting the challenge to the identity module and receiving a response from the identity module.

17. A method according to claim 13, wherein opening the protection comprises opening the second part to a volatile memory of the user equipment.

18. A method according to claim 13, further comprising allowing forwarding the first part and the second part of the encoded media content in an unprotected state.

19. A method according to claim 13, further comprising allowing forwarding the first part and the second part of the encoded media content in a protected state.

20. A method according to claim 13, further comprising receiving information on the media content.

21. A method according to claim 20, wherein receiving the information comprises receiving information on a price of opening the protection of the second part.

22. A method according to claim 20, further comprising accepting or withdrawing a request for opening the protection in response to the information on the media content.

23. A method according to claim 13, wherein receiving the media content comprises receiving a multimedia messaging service message in mobile user equipment.

24. A method as claimed in claim 13, wherein the protection of the second part is opened using an authentication algorithm that takes the secret as an input.

25. A method as claimed in claim 24, wherein the algorithm is algorithm A3 or A8.

26. A method as claimed in claim 25, wherein the secret is Ki.

27. A non-transitory computer-readable medium tangibly embodying a computer program, said computer program configured to control a computer to perform:
   encoding media content to a first part and a second part;
   protecting, using second data derived from a secret specific to an identity module, the second part of the encoded media content against unauthorized use, wherein the first part of the encoded media content has not been protected against unauthorized use using data derived from the secret specific to the identity module; and
   enabling transmission of the first part and the protected second part of the encoded media content to user equipment associated with the identity module.

28. A non-transitory computer-readable medium tangibly embodying a computer program, said computer program configured to control a computer to perform:
   receiving media content encoded to a first part and a second part, wherein the second part of the encoded media content is protected against unauthorized use using data derived from a secret specific to an identity module and wherein the first part of the encoded media content has not been protected against unauthorized use using data derived from the secret specific to the identity module;

requesting opening of the protection of the second part;

receiving enabling data; and opening the protection of the second part using data produced by an identity module associated with the user equipment and based upon the enabling data and the secret that is specific to and comprised in the identity module.

29. A network apparatus comprising:

a processor; and a memory including computer program code, wherein the memory and computer program code are configured, with the processor, to cause the network apparatus to at least perform:

encoding media content to a first part and second part;

protecting the second part of the encoded media content against unauthorized use using data derived from a secret specific to an identity module, wherein the first part of the encoded media content has not been protected against unauthorized use using data derived from the secret specific to the identity module; and determining that the first part and the protected second part of the encoded media content is to be transmitted to a user equipment associated with the identity module.

30. A network apparatus according to claim 29, wherein the memory and the computer program code are further configured with the processor to cause the network apparatus to encode the media content according to capabilities of the user equipment and/or user preferences of the user equipment.

31. A network apparatus according to claim 29, wherein the memory and the computer program code are further configured with the processor to cause the network apparatus to protect the second part by encryption.

32. A network apparatus according to claim 31, wherein the memory and the computer program code are further configured with the processor to cause the network apparatus to request an authentication code comprising a challenge and a response.

33. A network apparatus according to claim 32, wherein the memory and the computer program code are further configured with the processor to cause the network apparatus to encrypt the second part using the response as an encryption key.

34. User equipment comprising:

a processor;

a memory including computer program code; and a transceiver, wherein the transceiver is configured to:

receive media content encoded to a first part and a second part, wherein the second part of the encoded media content is protected against unauthorized use using data derived from a secret specific to an identity module and wherein the first part of the encoded media content has not been protected against unauthorized use using data derived from the secret specific to the identity module;

request opening the second part; and receive enabling data; and wherein the memory and the computer program code are configured, with the processor, to cause the user equipment to at least perform:

controlling the opening of the protection of the second part using the enabling data and a secret that is specific to and comprised in the identity module of the user equipment.

35. User equipment according to claim 34, wherein the enabling data is a challenge corresponding to a response used as an encryption key for protecting the second part.

36. User equipment according to claim 35, wherein the memory and the computer program code are further configured with the processor to cause the user equipment to submit the challenge to the identity module and to receive a response from the identity module.

37. User equipment according to claim 34, comprising a volatile memory, wherein the processor is configured to store the content of the second part accessible after opening the second part, to the volatile memory.

38. User equipment according to claim 34, wherein the memory and the computer program code are further configured with the processor to cause the user equipment to deny forwarding the first part and the second part of the encoded media content in an unprotected state.

39. User equipment according to claim 34, wherein the memory and the computer program code are further configured with the processor to cause the user equipment to allow forwarding the first part and the second part of the encoded media content in a protected state.

40. User equipment according to claim 34, wherein the memory and the computer program code are further configured with the processor to cause the user equipment to accept or withdraw a request for opening the protection of the second part in response to information on the media content received in the user equipment.

41. User equipment according to claim 34, comprising a mobile station.

42. User equipment according to claim 34, configured to receive a message transmitted by a multimedia messaging service.

43. User equipment comprising:

an identity module comprising a secret that is specific to the identity module and an algorithm;

a radio transceiver configured to receive media content encoded to a first part and a second part, configured to request opening of the protection of the second part and configured to receive enabling data, wherein the second part of the encoded media content is protected against unauthorized use using data derived from a secret specific to an identity module and wherein the first part of the encoded media content has not been protected against unauthorized use using data derived from the secret specific to the identity module; and a processor configured to provide the enabling data to the identity module for opening the protection of the second part.

44. User equipment according to claim 43, comprising a volatile memory, wherein the processor is configured to store the content of the second part accessible after opening the second part, to the volatile memory.

* * * * *